United States Patent
Surani et al.

(10) Patent No.: US 10,389,617 B1
(45) Date of Patent: Aug. 20, 2019

(54) WEB-BASED COMPUTING SYSTEM WITH CONTINUOUS BURN-IN TESTING

(71) Applicant: AMAZON TECHNOLOGIES, INC., Seattle, WA (US)

(72) Inventors: Mihir Sadruddin Surani, Seattle, WA (US); Eric Paul Wei, Seattle, WA (US); Diwakar Gupta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 743 days.

(21) Appl. No.: 14/858,899

(22) Filed: Sep. 18, 2015

(51) Int. Cl.
*G06F 15/173* (2006.01)
*H04L 12/26* (2006.01)
*H04L 12/911* (2013.01)
*G06F 11/36* (2006.01)

(52) U.S. Cl.
CPC .......... *H04L 43/50* (2013.01); *G06F 11/3668* (2013.01); *H04L 47/821* (2013.01)

(58) Field of Classification Search
CPC ............... G06F 11/3409; G06F 11/079; G06F 11/0751; G06F 11/3447; G06F 17/30867; G06F 9/505; G06F 9/5072; H04L 67/10; H04L 47/781; H04L 63/0861; H04L 41/12; H04L 43/08; H04L 43/16; H04L 43/50

See application file for complete search history.

(56) References Cited

U.S. PATENT DOCUMENTS

| | | | |
|---|---|---|---|
| 2007/0255518 A1* | 11/2007 | Jeon ....................... | G11B 5/455 702/113 |
| 2007/0297578 A1* | 12/2007 | Blair ....................... | H04L 12/64 379/67.1 |
| 2012/0198073 A1* | 8/2012 | Srikanth ............... | G06F 9/5027 709/226 |
| 2014/0282503 A1* | 9/2014 | Gmach ............... | H04L 41/0823 718/1 |
| 2015/0326449 A1* | 11/2015 | Melander ............ | H04L 41/5054 709/226 |
| 2017/0068733 A1* | 3/2017 | Tober ................ | G06F 17/30864 |

* cited by examiner

*Primary Examiner* — Brian J. Gillis
*Assistant Examiner* — Thao D Duong
(74) *Attorney, Agent, or Firm* — Blank Rome LLP

(57) ABSTRACT

This document describes techniques for performance testing computing resources in a service provider network. In an example embodiment, a performance manager periodically tests the performance of computing devices in the service provider network using selected computing assets of each computing device, and updates, based on the performance, a ranking value that establishes precedence for allocation of resource instances of the computing device. A placement manager assigns resource instances from the computing devices based on the ranking values.

20 Claims, 11 Drawing Sheets

WEB-BASED COMPUTING SYSTEM WITH CONTINUOUS BURN-IN TESTING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF THE DRAWINGS

For a detailed description of various examples, reference will now be made to the accompanying drawings in which.

DETAILED DESCRIPTION

Figure 1:
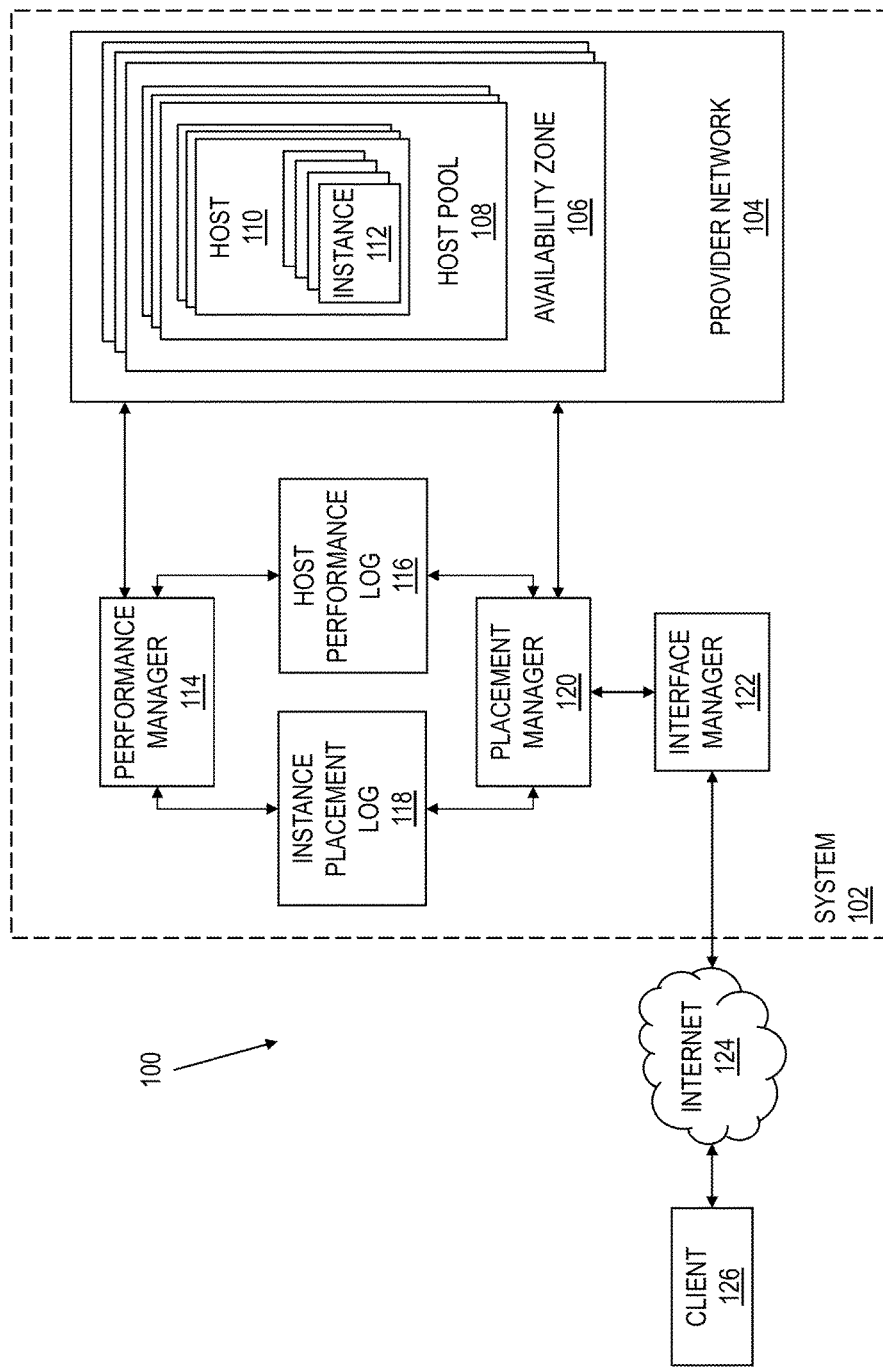
FIG. 1 shows an illustrative system environment in accordance with various examples.

Various embodiments of methods and apparatus for ranking operating computing resources using continuous performance testing are described. Networks set up by an entity such as a company or a public sector organization to provide one or more services (such as various types of cloud-based computing or storage) accessible via the Internet and/or other networks to a distributed set of clients may be termed provider networks in this document. Such a provider network may include numerous data centers hosting various resource pools, such as collections of physical and/or virtualized computer servers, storage devices, networking equipment and the like, needed to implement and distribute the infrastructure and services offered by the provider. The computing resources may in some embodiments be offered to clients in units called "instances," such as virtual or physical compute instances, storage instances, or other resource instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications, and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for the applications, without for example requiring the client to access an instance or an execution platform directly. A given execution platform may utilize one or more resource instances in some implementations; in other implementations multiple execution platforms may be mapped to a single resource instance.

In some embodiments the provider network may be organized into a plurality of geographical regions, and each region may include one or more availability zones. An availability zone in turn may comprise one or more distinct locations or data centers, engineered in such a way that the resources in a given availability zone are insulated from failures in other availability zones. That is, a failure in one availability zone may not be expected to result in a failure in any other availability zone; thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

As computing demands increase, the operator of the provider network may add new computing devices and/or replace aging data center equipment with newer computing devices that provide increased capacity and performance. Over time, the operational capabilities of some computing devices of the provider network may change due to effects of aging, software regression, etc. To identify and accommodate changes in operation performance occurring over time, the provider network may implement a performance manager that continually monitors the performance of each computing device. The performance manager may monitor the performance of a computing device by periodically executing performance tests on the computing device using resources of the computing device that are not allocated to a client at the time of test execution. Based on the results of the testing, the performance manager may revise or update a ranking value associated with the computing device that quantifies overall performance of the computing device. The ranking value may be increased or decreased in correspondence to measured increases and decreases in performance of the computing device.

The performance manager may prioritize the various computing devices of the provider network for testing. The priority assigned to testing of a given computing device may be based on time expired since the given computing device was last tested. For example, the longer the time since the computing device was last performance tested, the higher the priority assigned to performance testing the computing device. Each computing device may include assets sufficient to support a number of resource instances (e.g., a number of virtual machines that are individually assignable to clients). For example, a computing device may include a number of sets of computing assets, such as processors with associated memory and other computer hardware. Each set of such computing assets may be referred to as a computing slot, where each computing slot is used to implement a resource instance. In some computing devices, each computing slot, and the computing assets assigned to the slot, may be dedicated for use in implementing a single resource instance. In other implementations, computing assets may be shared by multiple resource instances. The performance manager may select one of the resource instances, and associated computing slot, for use each time the computing device is performance tested. The performance manager may record results for performance testing using each resource instance.

The performance of a computing device may be affected by a variety of factors. For example, loading of resource instances assigned to a client may affect the performance of a resource instance used by the performance manager to test the computing device. The performance manager measures the overall loading of the computing device, and records a value corresponding to the loading in conjunction with the ranking value derived from performance testing.

Embodiments of the provider network may also include a placement manager that controls allocation of resource instance to clients. For example, when a client requests allocation of a resource instance for use in execution of a client's system (e.g., to execute a web server), the placement manager may receive the request, identify an available resource instances, and assign a resource instance to the client. The placement manager may apply the ranking values associated with the computing devices that implement the resource instances to select a resource instance to assign to the client. For example, the placement manager may assign resource instances in an order corresponding to the ranking values of the computing devices such that resource instances are allocated from computing devices having higher ranking values prior to assignment of resource instances from computing devices having lower ranking values.

In conjunction with the ranking value of a computing device, the placement manager may apply the measure of loading recorded by the performance manager to select a computing device from which to allocate a resource instance. For example, if multiple computing devices have been assigned an equivalent ranking value, then the placement manager may select a more lightly loaded one of the computing devices from which to allocate an instance rather than a more highly loaded one of the computing devices. Further details of the operations of various embodiments of the performance manager and the placement manager are provided below in conjunction with the descriptions of FIGS. 1-12.

FIG. 1 shows an illustrative system environment 100 in accordance with various examples. The system environment 100 includes a system 102, in communication with a client 126 via the internet 124. The system 102 includes a provider network 104. The provider network 104 includes a plurality of availability zones 106. Each availability zone 106 in turn may comprise one or more distinct locations or data centers, engineered in such a way that the resources in a given availability zone 106 are insulated from failures in other availability zones 106. That is, a failure in one availability zone may not be expected to result in a failure in any other availability zone. Clients may be able to protect their applications from failures at a single location by launching multiple application instances in respective availability zones. In some implementations, inexpensive and low latency network connectivity may be provided between resource instances that reside within the same geographical region (and network transmissions between resources of a same availability zone 106 may be even faster). Any or all of the elements of the system 102 may be operated in one or more of the availability zones 106.

Each availability zone 106 may include multiple host pools 108, each of which includes a number of hosts 110. A host 110 is a computing device that includes computing assets suitable for supporting a number of resource instances 112. For example, each host 110 may include a number of processors and associated memory, network interfaces, etc. that can execute instructions to provide a virtual machine or other system for use by the client 126. The various resource instances 112 of the different availability zones 106 may be reserved and/or allocated for use by clients (or potential clients) such as client 126. In the illustrated embodiment, system 102 also includes a placement manager 120, a performance manager 114, an instance placement log 118, and a host performance log 116. In some embodiments the functionality of the interface manager 122 may be implemented by a subcomponent of the placement manager 120 or other component of the system 102. The interface manager 122 may in some embodiments implement one or more programmatic interfaces allowing the client 126 to search for, browse, reserve and acquire resource instances 112 to obtain various types of services, e.g., to run and/or access various applications.

Each host pool 108 may include hosts 110 that differ in capability or configuration from the hosts 110 of another host pool 108. For example, the hosts 110 of a first host pool 108 may be configured to support a first type of resource instance 112, while the hosts 110 of a second host pool 108 may be configured to support a second type of resource instance 112, where the first and second types of resource instances 112 may differ in terms of the quantity or nature of resources provided for use by the client. That is, one type of resource instance 112 may provide more computing hardware, such as processors, processor cores, memory, etc., for use by a client than is provided by a different type of resource instance 112. Similarly, capabilities of different types of resource instances 112 may differ. For example, one type of resource instance 112 may execute a WINDOWS operating system, while a different type of resource instance 112 may execute a LINUX operating system.

The host pools 108 may represent logical collections or aggregations, so that, for example, the presence of two hosts 110 in the same pool 108 may not necessarily imply anything about the physical location of the two hosts 110. Although the hosts 110 illustrated in FIG. 1 are shown as belonging to availability zones 106, in other embodiments the provider network 104 may be organized differently: e.g., in some embodiments availability zones may not be implemented. Availability zones 106 may be grouped into geographic regions (not shown in FIG. 1) in some embodiments. Host pools 108 may be implemented within availability zones 106 in some implementations, while in other implementations a host pool 108 may span multiple availability zones 106.

The provider network 104 may include thousands of hosts 110 that were built and put into service at different times. Each host 110 may be tested to ensure acceptable performance prior to its introduction into the provider network 104. Unfortunately, aging, temperature effects, software flaws, and other circumstances may cause the performance of a host 110 to change over time. To track operational performance, the performance manager 114 repetitively tests the hosts 110 after the hosts 110 have been made available for allocation of resource instances 112 to a client. The host performance log 116 stores information related to status and results of performance testing of each of the hosts 110. A ranking value stored in the host performance log is associated with each host 110. The performance manager 114 updates the ranking value for a host 110 each time the performance manager 114 tests the host 110 so that the ranking value reflects the performance of the host as last tested. For example, when a host 110 is initially made available for use in the provider network 104, the ranking value may be set to 100 indicating that the host 110 is providing an optimal level of performance. Metrics reflecting results of particular tests executed to provide the ranking value may also be stored in the host performance log. The test result metrics may be applied to identify changes in the performance of the host 110. The performance manager 114 continues to monitor the performance of the host 110 by causing the host 110 to execute performance tests from time to time. If the testing indicates that the performance of the host 110 has changed, then the ranking value associated with host 110 is adjusted to reflect the change in performance. If metrics produced by testing of host 110 indicate that the performance of the host 110 has decreased relative to the metrics produced by a previous test execution, then the performance manager 114 may reduce the ranking value associated with the host 110. Conversely, if metrics produced by testing of host 110 indicate that the performance of the host 110 has increased relative to the metrics produced by a previous test execution, then the performance manager 114 may increase the ranking value associated with the host 11.

The performance manager 114 may test each of the different types of computing assets provided a host 110. Accordingly, a change in performance measured for any of the computing assets may result in a change in ranking value associated with the host 110. For example, the performance manager 114 may test processor performance, memory performance, secondary storage access performance, network performance, etc. for a host 110. Processor testing may include execution of various sets of instructions, timing of the execution, and verification of results of execution. Memory testing may include reading and writing of various data patterns to memory, verification that data is properly stored, and timing of the accesses. Secondary storage testing may include reading and writing of various data patterns to secondary storage, which may include magnetic disks, FLASH memory, etc., verification that data is properly stored, and timing of the secondary storage accesses. Network performance testing may include transfer of data packets between the host 110 and another device via a local or wide area network, verification and timing of packet transfer, monitoring of dropped packets, etc.

Some embodiments of the performance manager 114 may test network performance of a host 110 over a variety of distances and routes. For example, the performance manager 114 may provide a host 110 being tested with a variety of destination addresses (e.g., virtual internet protocol addresses) with which the host 110 being tested is to communicate. The destination addresses may be assigned to resource instances 112 controlled by the performance manager 114 or available to the performance manager 114 for use in testing network access performance. The resource instances 112 associated with the destination addresses may be located a various distance from the host 110 be tested. For example, a first such resource instance 112 may be located in the same equipment rack as the host 110 being tested, and provide for testing of network communication over a relatively short distance. A second such resource instance 112 may be located in the same data center as the host 110 being tested, but in a different equipment rack, and provide for testing of network communication over a relatively longer distance, over different network connections, than a resource instance 112 located in the same equipment rack as the host 110 being tested. A third such resource instance 112 may be located in a different data center than the host 110 being tested, and provide for testing of network communication over a relatively longer distance, and over different network connections, than a resource instance 112 located in the same data center as the host 110 being tested. Latency, rate, and other parameters of communication between the host 110 being tested and each destination address may be measured by the host 110 during testing. Via such testing, the performance manager 114 may measure the performance of a host 110 with respect to various network topologies and configurations.

A change in performance for any of the tested computing assets may cause the performance manager 114 to adjust the ranking value associated with the host 110 in accordance with the change in performance. If a last executed test indicates the processor performance has decreased relative to a previously recorded performance, then the performance manager 114 may reduce the ranking value associated with the host 110 by an amount that reflects the change in performance. Similarly, changes in performance of memory, secondary storage access, network access, or any other tested computing asset may cause the performance manager 114 to adjust the ranking value associated with the tested host 110. Just as a measured decrease in performance of a tested computing asset may cause the performance manager 114 to reduce the ranking value for the host 110, a measured increase in performance of a tested computing asset may cause the performance manager 114 to increase the ranking value for the host 110.

Each host 110 includes sufficient computing assets to support a number of resource instances 112. As noted above, a set of computing assets that support a resource instance may be referred to as a slot. The performance manager 114 tests the host 110 by identifying a set of computing assets (i.e., a slot) that is not currently being used to provide a resource instance to a client, and applying the identified available computing assets to execute tests that measure the performance of the computing assets. That is, the performance manager 114 identifies computing assets that are available for allocation to client, but are currently unallocated, and thus available for use by the performance manager 114. The performance manager 114 launches a resource instance using the identified computing assets and runs performance tests using the resource instance. When the performance tests are complete, the performance manager retrieves the results of the tests, e.g., retrieves performance metrics generated by the tests, from the resource instance, stores the results in the host performance log 116 with reference to the computing assets used to execute the tests, and updates the ranking value associated with the host 110 based on the results of testing.

Figure 2A:
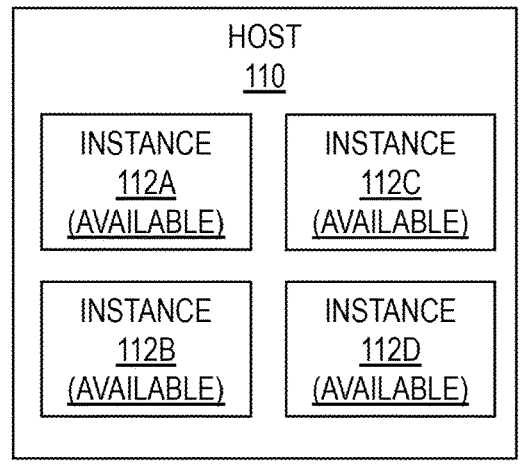
FIGS. 2A, 2B, and 2C show illustrative resource instance allocations encountered in performance testing in accordance with various examples.
Figure 2B:
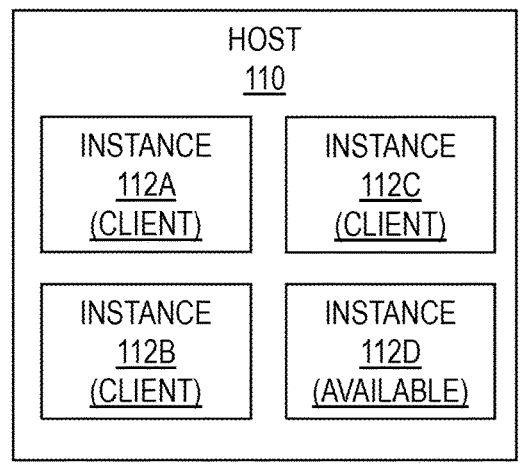
Figure 2C:
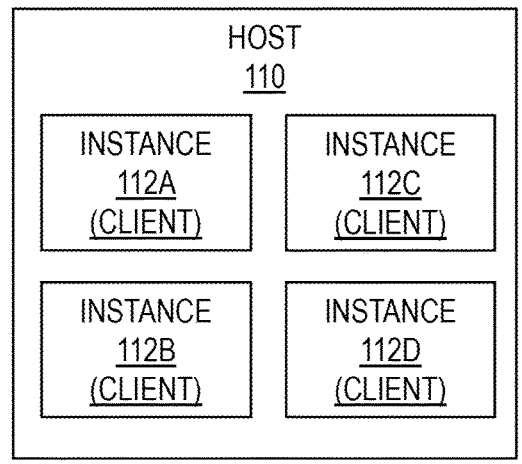

FIGS. 2A-2C show examples of configurations of a host 110 encountered by the performance manager 114 when testing the host 110. In FIGS. 2A-2C, the host 110 is configured to support four resource instances 112. That is, the host 110 includes computing assets that allow the host 110 to provide four resource instance of a particular type to a client, and each of the resource instances 112A, 112B, 112C, and 112D corresponds to distinct underlying computing assets of the host 110. In other embodiments, the host 110 may be configured differently, and provide a different number and/or a different type of resource instances. In FIG. 2A, none of the resource instances 112A, 112B, 112C, and 112D is currently assigned to client. Accordingly, all of computing assets underlying the resource instances 112A, 112B, 112C, and 112D are available for use by the performance manager 114 for performance testing of the host 110. The performance manager 114 may launch one or more of the instances 112A, 112B, 112C, and 112D to execute performance testing. In some embodiments, the performance manager 114 may select one of the instances 112A, 112B, 112C, and 112D least recently used by the performance manager 114 to execute performance testing. The performance manager 114 can separately record results of testing performed by each resource instance 112A, 112B, 112C, and 112D. That is, different portions of the host performance log 116 may be dedicated to storage performance test results produced by each of instance 112A, 112B, 112C, and 112D.

In FIG. 2B, resource instances 112A, 112B, and 112C are currently assigned to a client. Resource instance 112D, and the computing assets underlying resource instance 112D, are not currently assigned to a client. Accordingly, the performance manager 114 will launch instance 112D and execute performance tests thereon. The performance manager 114 will record the results of the performance testing using instance 112D in the host performance log 116.

In FIG. 2C, all of the resource instances 112A, 112B, 112C, and 112D are currently assigned to a client. Consequently, the performance manager 114 is unable to execute performance testing of the host 110. In some embodiments, the host performance manager 114 may prioritize performance testing of the hosts 110 based on when each host 110 was previously tested. For example, less recently tested hosts 110 may be assigned higher priority for performance testing than more recently tested hosts 110. The performance manager 114 may construct and maintain a priority ordered list of hosts 110 in the performance log 116 that specifies an order in which the hosts 110 are to be performance tested. If a host is unable to be tested at a given time because all instances supported by the host 110 are assigned to a client, then the performance manager 110 may maintain or increase the value of priority assigned to the host 110 by moving the host towards the head of the list or maintaining the host 110 at the head of the list. Similarly, if computing assets of the host 110 are available, and the performance manager 114 tests the host 110, then the performance manager 114 may decrease the value of priority assigned to the host 110 by moving the host to the tail of the list. The performance manager 114 may attempt to test the hosts 110 on a periodic basis. For example, the performance manager 114 may attempt to execute performance testing of some hosts (e.g., the highest priority hosts 110 having available computing assets) each hour, each day, etc.

Figure 3:
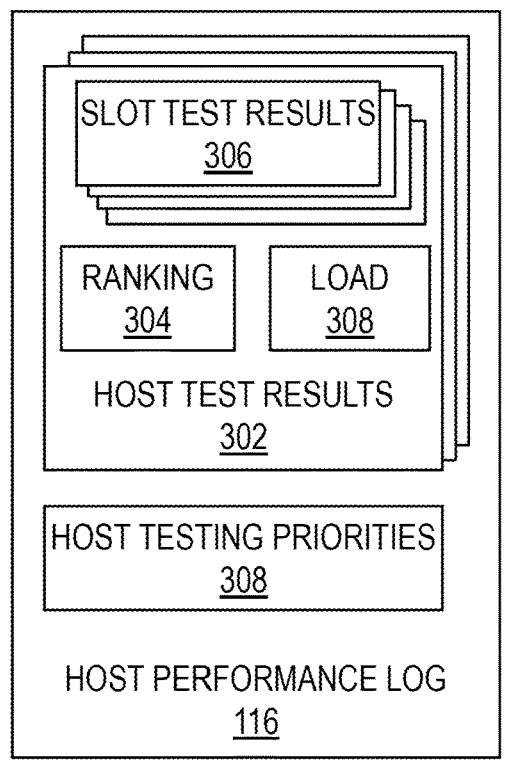
FIG. 3 shows a block diagram of a host performance log in accordance with various examples.

FIG. 3 shows an illustrative diagram of the host performance log 116. The host performance log 116 includes host performance test results 302 for each host 110. The host test results 302 include the results obtained by testing the host 110 using each set of computing assets underlying a different resource instance 112 (i.e., each slot). The host test results 302 also include the ranking value 304 assigned to the host based on the test results 306, and a value of loading 308 of the host 110. The host performance log 116 further include host testing priorities 308 that record a value of priority for testing each of the hosts 110. As explained above, the host testing priorities 308 may be arranged as list of host identifiers with hosts 110 have high testing priority at the head of the list and hosts 110 with lower priority at the tail of the list.

The performance manager 114 may prioritize the hosts 110 for testing based on various criteria. As explained with reference to FIG. 2C, priorities may be assigned based on time since a host 110 was last tested or if a customer has complained about performance of his or her instance (e.g., admins may be able to add information to performance manager 114 that reflects that an issue occurred on a server. The information can be used to adjust the priority of a given host). That is, more recently tested hosts 110 may be assigned a lower priority for performance testing than less recently tested hosts 110. In some embodiments of the performance manager 114, may prioritize hosts 110 for testing based on previously measured performance. For example, if performance testing indicates that performance of a given host 110 or performance of a component or subsystem of the given host 110 is decreasing, then the performance manager 114 may increase the priority associated with the given host 110 to cause the given host 110 to be retested sooner than would occur had the priority not been increased. By retesting the given host 110 sooner, the performance manager 114 can more rapidly determine whether the given host 110 is continuing to degrade or the decrease in performance has been abated.

The performance of a host 110 may be affected by the operation of resource instances 112 assigned to a client. For example, referring to FIG. 2B in which three of four resource instances 112 of the host 110 are assigned to a client, use of network resources, processor resources, or other resources of the host 110 in executing the client's application on resource instances 112A, 112B, and 112C may reduce the overall performance of the host 110 to the extent that the performance tests executed via resource instance 112D indicate that performance of the host 110 has decreased. The performance manager 114 may reduce the ranking value 304 responsive to the measured decrease in performance. To inform the ranking value 304 for the host 110, the performance log 116 also includes, in the host test results 302, a load value 308 that reflects the degree to which the host 110 was loaded, due to client applications, at the time the host 110 was last performance tested. The load value 302 may be derived from load information provided via agents executing on the instances 112A, 112B, and 112C. Such agents may report, for example, measurements of processor activity time, network activity time, packets transferred via the network, and other values indicative of loading. The performance manager 114, or other component of the system 102, may derive the loading value 308 from such loading information. For example, the load value 308 may be calculated as an average processor utilization of the resource instances 112 assigned to clients, average network utilization, etc. Other embodiments of the host performance log 116 may arrange the test result, load indicator, and priorities or differently than is illustrated in FIG. 3, or may include different or additional information. For example, a value of host loading corresponding to each set of performance test results may be included in test results 306.

Figure 4:
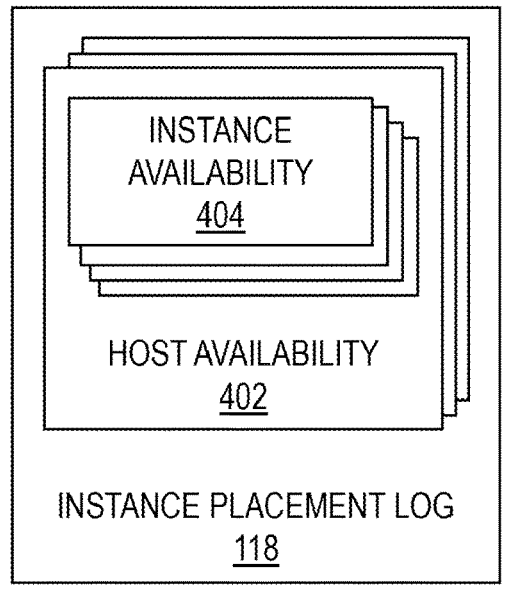
FIG. 4 shows a block diagram of an instance placement log in accordance with various examples.

The performance manager 114 may identify compute assets of a host 110 that are available for use in performance testing by accessing the instance placement log 118. The instance placement log 118 stores information indicating which computing assets of each host 110 are currently being used to provide resource instances 112 to a client. For example, if a host 110 includes computing assets configured to provide four resource instances 112, then the instance placement log 118 may include storage fields that indicate whether each of the four resource instances 112 or the corresponding computing resource have been assigned to a client. FIG. 4 shows an illustrative diagram of the instance placement log 118. The instance placement log 118 includes a host availability record 402 for each host 110. The host availability record 402 includes instance availability values 404 that specify whether or not each resource instance 112 supported by the host 110 is currently allocated to a client. Resource instances 112 that are not allocated to client are available for use in performance testing the host 110.

The instance placement log 118 is maintained by the placement manager 120. The placement manager 120 allocates resource instances 112 to clients responsive to requests for resource instances received from the clients. For example, if the client 126 has a need to execute an application using the provider network 104, then the client 126 may transmit, to the placement manager 120 via the internet 124 and interface manager 122, a request for allocation of resource instances 112. The placement manager 120 receives the request for allocation of resource instances 112, accesses the instance placement log 118, retrieves host availability records 402, and determines which resource instances 112 are available based on the instance availability values 404.

In addition to determining which resource instances are available for allocation to a client, the placement manager 120 may identify which of the available resource instances 112 potentially provides the best performance. To ascertain the potential performance of each of the available resource instances 112, the placement manger 120 accesses the host performance log 116 and retrieves a ranking value for the host 110 that corresponds to each of the available resource instances 112. The placement manager 120 may prefer the hosts 110 having the highest ranking values. That is, the placement manager 120 may prefer hosts 110 having the highest measured performance. Accordingly, the placement manager 120 may compare the ranking values of each host 110 corresponding to an available resource instance 112 to determine which of the hosts 110 provide the highest measured performance. The placement manager 120 may select one of the highest ranked hosts 110 from which to allocate a resource instance 112 to the client.

In some embodiments, the placement manager 120 may also consider the load value 308 of each host 110 when selecting a host 110 from which to allocate a resource instance 112 to a client. For example, lightly loaded hosts 110 may be preferred over heavily loaded hosts 110. Accordingly, if two hosts 110 have a same performance ranking, then the placement manager 120 may select the more lightly loaded one of the hosts 110 from which to allocate a resource instance to the client.

Figure 5:
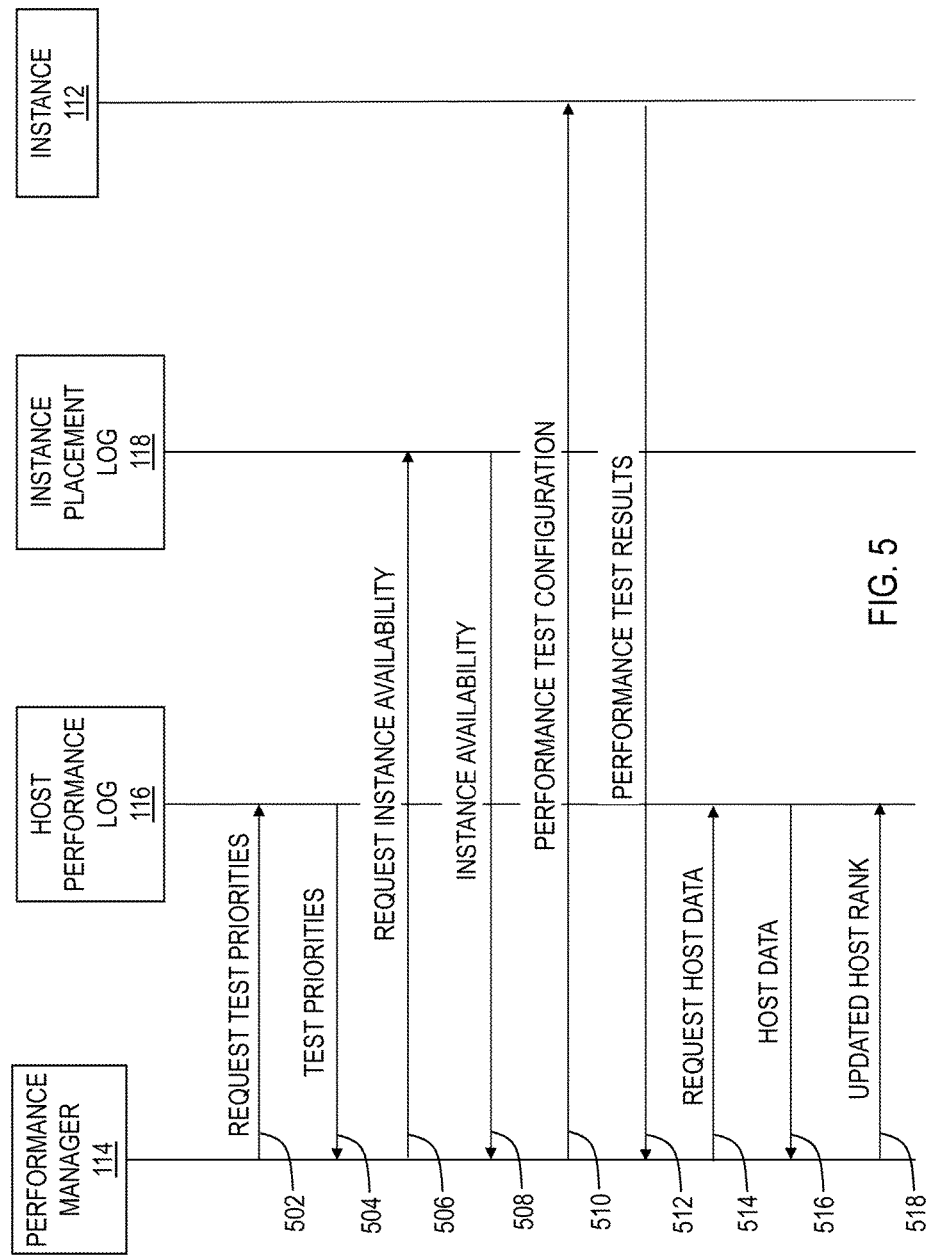
FIG. 5 shows illustrative communication for performance testing of host devices in accordance with various examples.

FIG. 5 shows illustrative communication for performance testing of host devices 110 in accordance with various examples. The performance manager 114 coordinates the performance testing of the hosts 110. The performance manager 114 initiates performance testing periodically over the operational life of the each host 110. If the performance of a host 110 declines for any reason, then that host 110 and resource instances 112 provided by that host 110 become less desirable. To initiate performance testing, in 502, the performance manager 114 communicates with the host performance log 116 to determine which host 110 should be performance tested. The host performance manager 114 may request testing priorities 308 from the host performance log 116. The testing priorities 308 may identify the relative urgencies associated with performance testing each host 110. The testing priorities may be based on time since a last performance test was performed on the host 110 in some implementations. For example, a host 110 last tested one week ago may have a higher priority for testing than a host 110 last tested one hour ago. In 504, the host performance log 116 provides the requested test priorities to the performance manager 114. The performance manager 114 receives the test priorities and identifies the host 110 assigned the highest priority for performance testing.

Having identified a host 110 to be performance tested, the performance manager 114, in 506, requests instance availability information for the host 110 to be tested from the instance placement log 118. The instance placement log 118 stores information identifying which slots of each host 110 are currently being used to provide resource instances 112 to a client. Slots not currently being used to provide resource instances 112 to a client may be available for use by the performance manager 114 to launch a resource instance 112 for use in performance testing the host 110. In 508, the instance placement log 118 provides instance availability information to the performance manager 114. The performance manager 114 receives the instance availability information and identifies a slot of the host 110 that is available for use in performance testing the host 110.

In some embodiments, the performance manager 114 may communicate with the instance placement log 118 to reserve the slot and associated resource instance 112 for use in performance testing of the host 112. The reservation may be made through communication between the performance manager 114 and the placement manager 120 in some embodiments.

Having identified a slot of the host 110 that is not being used to provide a resource instance 112 to a client, the performance manager, in 510, launches a resource instance 112 on the slot, and configures the resource instance 112 to execute performance tests. As explained herein, each host 110 is configured to provide a predetermined number of resource instances 112 of a predetermined type. Configuration of the resource instance 112 to execute the performance tests may include downloading programming that is executed by the resource instance 112 to provide the performance testing. The programming may include instructions for testing performance of processors of the host 110, memory of the host 110, secondary storage access by the host 110, network access by the host 110, etc.

The performance manager 114 causes the instance 112 to execute the performance tests, and in 512, the resource instance 112 provides results of the performance tests to the performance manager 114. The results may include performance metrics for various tested components and in some embodiments may include information related to the loading, during the performance testing, of the host due to instances 112 assigned to clients. The performance manager 114 uses the performance test results to update the ranking value associated with the host 110. In 514, the performance manager 114 requests performance data for the tested host 110 from the host performance log 116. The requested host performance data may include the slot test results 306, ranking value 304, and loading value 308 for the tested host 110.

In 516, the host performance log 116 provides the requested host performance data to the performance manager 114. The performance manager 114 receives the host performance data and evaluates the test results received from the resource instance 112 relative to the test results provided in the host performance data (for previous testing of the host 110). If the test results received from the instance 112 indicate the overall performance of the host 110 has declined, then the performance manager 114 decreases the ranking value associated with the host 110. If the test results received from the instance 112 indicate the overall performance of the host 110 has improved, then the performance manager 114 increases the ranking value associated with the host 110.

In 518, the performance manager 114 transfers the performance test results received in 512, the updated ranking value, and the loading value to the host performance log 116 for storage and future use in selecting hosts 110 from which to allocate a resource instance 112.

In some embodiments, the performance manager 114 may communicate with the instance placement log 118 to free the slot and associated resource instance 112 used in performance testing of the host 112. The performance manager 114 may communicate with the instance placement log 118 via the placement manager 120 to free the slot in some embodiments.

Figure 6:
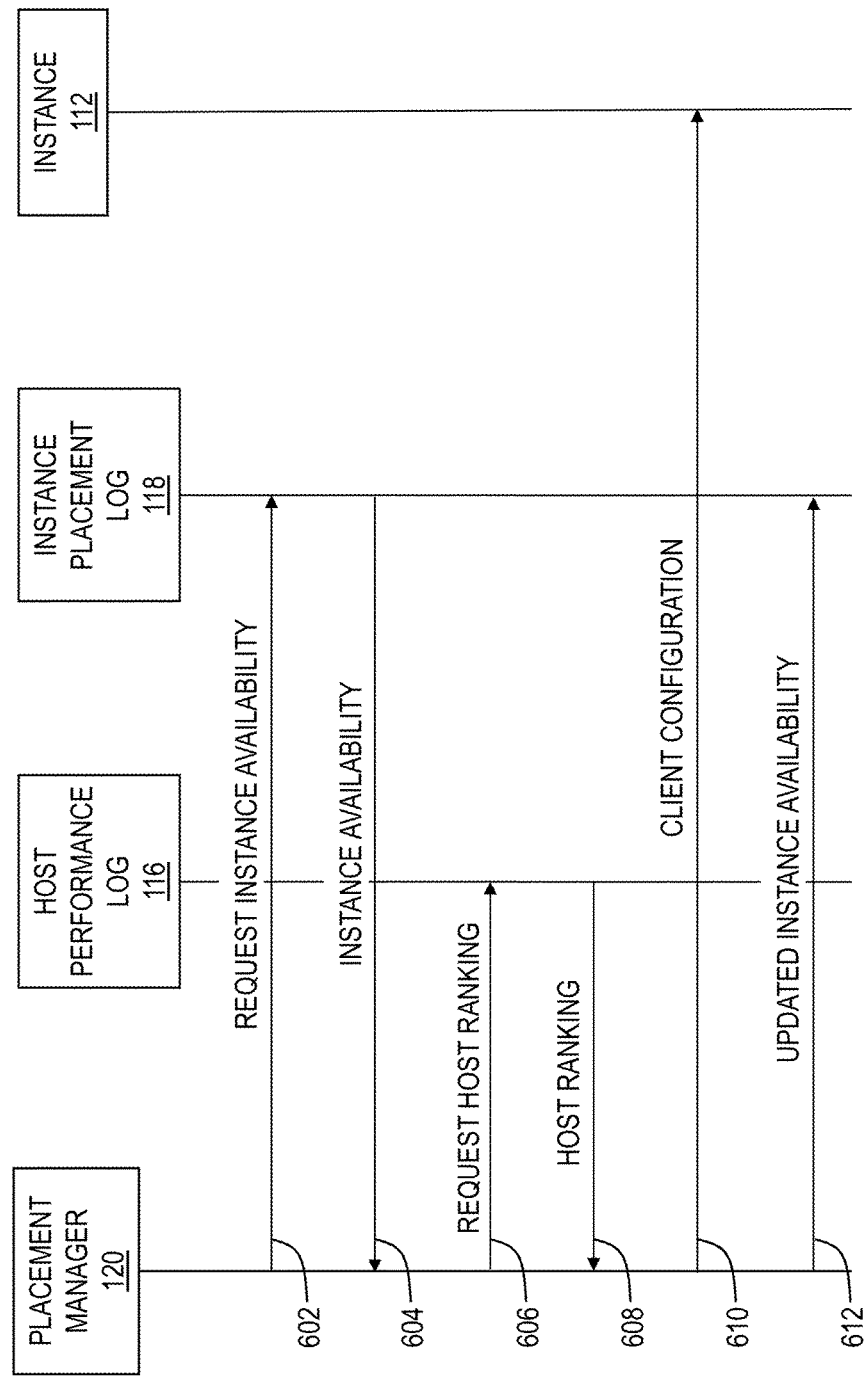
FIG. 6 shows illustrative communication for placement of resource instances in accordance with various examples.

FIG. 6 shows illustrative communication for placement of resource instances 112 in accordance with various examples. The placement manager 120 coordinates allocation of resource instances 112 to clients. The placement manager 120 initiates allocation of a resource instance 112 to a client based on receipt of a request for a resource instance 112 from a client. On receipt of a request for a resource instance 112 from a client, in 602, the placement manager 120 communicates with the instance placement log 118 to determine which of the hosts 110 include instances 112 of the type requested by the client that are currently not assigned to a client. In 604, the instance placement log 118 provides the requested host and instance information to the placement manager 120. The placement manager 120 receives the host and instance information and, in 606, communicates with the host performance log 116 to retrieve information specifying the performance of each of the hosts 110 that has instances 112 available for allocation. That is, the performance manager 114 requests, from the host performance log 116, performance data for each host 110 that has an instance 112 available for allocation. The requested performance data may include ranking values 304 and loading values 308 for each of the hosts 110.

In block 608, the host performance log 116 provides the requested host performance data to the placement manager 120. The placement manager 120 receives the host performance data and identifies the hosts 110 having the highest ranking values. The placement manager 120 may select one or more of the hosts 110 having a highest ranking value from which to allocation resource instances to the client. Of hosts with equivalent ranking values, the placement manager 120 may select one over another for various reasons. For example, if the client requested multiple resource instances 112, the placement manager 120 may select hosts 110 such that the number of hosts 110 from which resource instances 112 are allocated is minimized. Additionally, the placement manager 120 may select hosts 110 having a lower loading value in preference to hosts 110 having a higher loading value.

Having selected a host 110 from which to assign a resource instance 112 to the client, in 610, the placement manager 120 configures the instance 112 of the selected host 110 for use by the client. In 612, the placement manager 120 communicates updated instance placement information to the instance placement log 118. The updated instant placement information indicates that the resource instance allocated to the client is reserved and thus no longer available for use in performance testing or by another client. The placement manager 120 may also inform the client that the allocated resource instance 112 is available for use.

Figure 7:
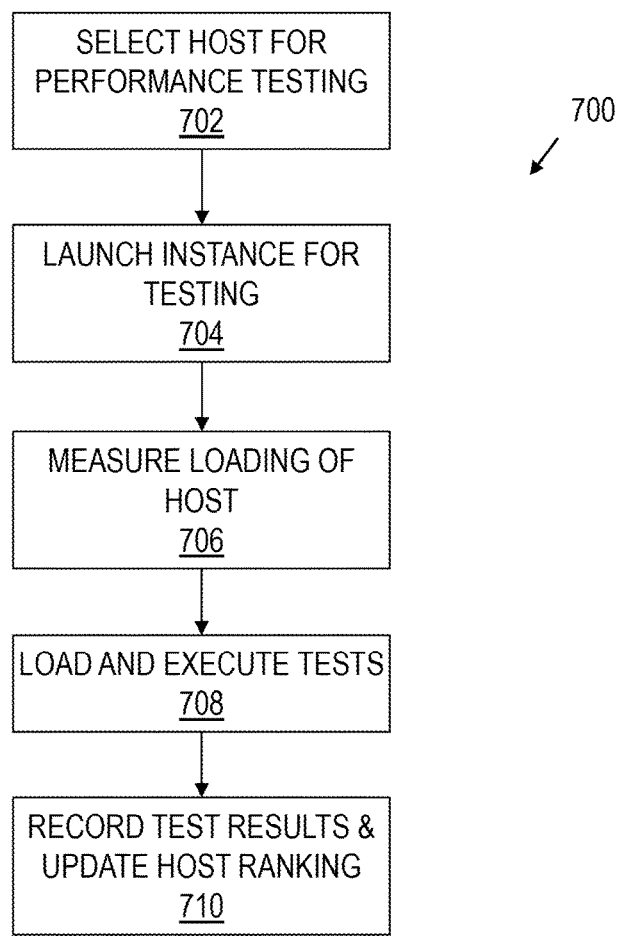
FIG. 7 shows a flow diagram for a method for continuous performance testing of hosts in accordance with various examples.

FIG. 7 shows a flow diagram for a method 700 for continuous performance testing of hosts 110 in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 700 may be provided by instructions executed by a computer of the system 102.

In block 702, the performance manager 114 selects a host 110 to be performance tested. In some embodiments, the performance manager 114 may continually attempt to execute performance testing of some available hosts 110, or may trigger to execution of a performance test based on time or other factors. For example, if a particular host has not been tested within a predetermined time interval, then expiration of the time interval may trigger the performance manager 114 to initiate testing of the host 110. Further details regarding selection of host 110 to be performance tested are provided in FIG. 8 and associated text.

In block 704, the performance manager 114 launches a resource instance 112 on the selected host 110. In some embodiments, launching the resource instance 112 may include communicating with the placement manager 120 to obtain use of the resource instance 112. The placement manager 120 can update the instance placement log 118 to reflect allocation of the instance 112 to the performance manager 114. Similarly, when performance testing is complete, the performance manager 114 may communicate with the placement manager 120 to release the resource instance 112 to be allocated to clients. In some embodiments, the performance manager 114 may update the instance placement log 118 without communicating with the placement manager 120.

In block 706, the performance manager 706 measures the loading of the host 110 that results from resource instances 112 of the host 110 being used to execute a client application. The measurement of loading may be derived from load information provided via agents executing on the instances 112. Such agents may report, for example, measurements of processor activity time, network activity time, packets transferred via the network, and other values indicative of loading.

In block 708, the performance manager 114 configures the resource instance 112 to execute the performance test routines that measure the performance of the host 110. For example, the performance manager 110 may load processor test routines that measure, individually and/or aggregately, the performance of the processor cores utilized by the resource instance 112, memory test routines that measure timing and/or retention of the memories utilized by the resource instance 112, secondary storage access test routines that measure the capability and responsiveness of the resource instance 112 in accessing secondary storage, and/or network access test routines that measure the network access performance of the resource instance 112. The resource instance 112 executes the performance test routines to measure host 110 performance, and provides the results of the testing to the performance manager 114.

In block 710, the performance manager 114 receives the results of the performance testing from the resource instance 112. The performance manager 114 evaluates the results relative to results of previously executed performance tests and updates the ranking of the host 110. The performance manager 114 records the received test results and the updated ranking in the host performance log 116 for use by the placement manager 120. Further details regarding updating of host performance rankings are provided in FIG. 9 and associated text. While the operations of method 700 have been described with reference to performance testing a single host 110, in some embodiments, the performance manager 114 may concurrently execute performance testing on a number of hosts 110. On completion of the operations of block 710, some embodiments may proceed to test a different host 110 by re-executing the operations of block 702.

Figure 8:
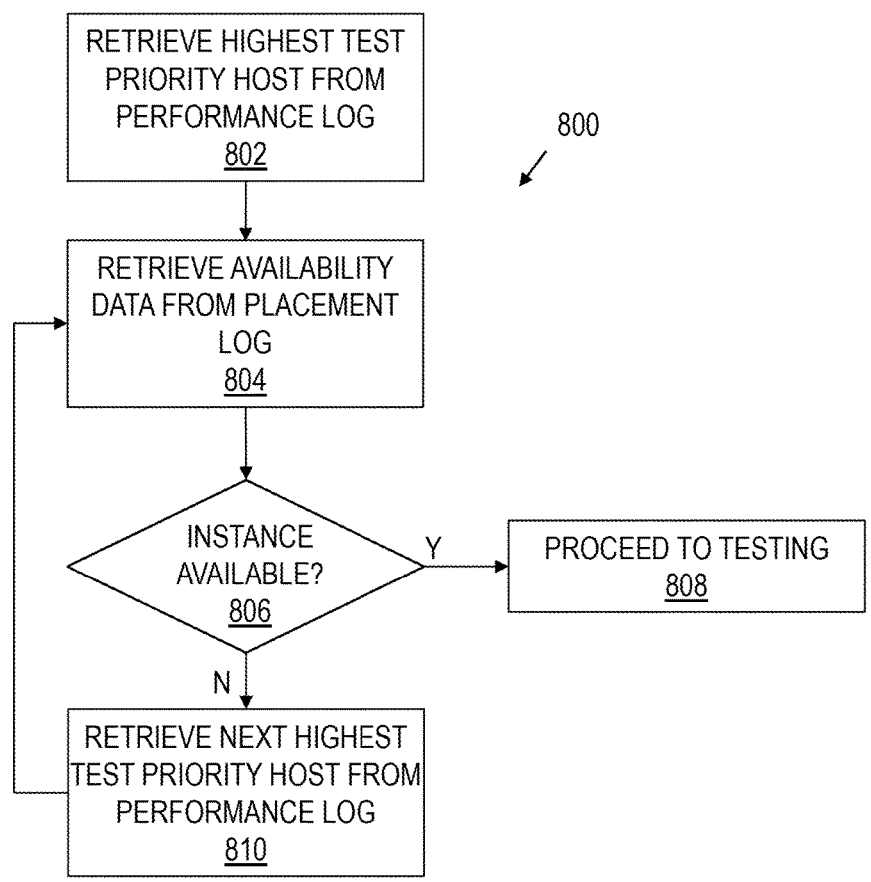
FIG. 8 shows a flow diagram for a method for selecting a host device for performance testing in accordance with various examples.

FIG. 8 shows a flow diagram for a method 800 for selecting a host 110 for performance testing in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 800 may be provided by instructions executed by a computer of the system 102. Operations of the method 800 may be performed as part of the operation of block 702 of method 700 shown in FIG. 7.

In block 802, the performance manager 114 is selecting a host 110 for performance testing. In some embodiments, the performance manager selects a host 110 to test based on time based priority values where higher priority is assigned to testing of hosts 110 that have been tested less recently, and lower priority is assigned to testing of hosts 110 that have been tested more recently. In some embodiments, the performance manager 114 retrieves test priorities 308 from the host performance log 116 to determine which hosts 110 have been assigned highest priority for testing. The test priorities 308 may include a list of hosts 110 arranged in order of priority for performance testing. The performance manager 114 may select, for performance testing, one of the hosts 110 assigned highest priority.

In block 804, the performance manager 114 retrieves availability data, from the instance placement log 118, for the host 110 selected for performance testing. The performance manager 114 may access the instance placement log 118 directly or through another component, such as the placement manager 120. The availability data retrieved from the instance placement log 118 indicates which computing assets, and associated instances 112, are allocated to clients, and correspondingly which are available for use in performance testing.

In block 806, the performance manager 114 evaluates the retrieved availability data for the host 110 selected for performance testing. If computing assets, and an associated resource instance 112, of the host 110 are available for use in performance testing, then the performance manager 114 proceeds to performance test the host 110 using the available instance 112 in block 808. For example, the performance manager 114 may proceed to perform the operations of blocks 704-710 of method 700.

If, on the other hand, the retrieved availability data indicates that all of the resource instances 112 supported by the host 110 are allocated to clients, then, in block 810, the performance manager 114 selects a different host 110 to performance test. For example, using the test priorities retrieved from the host performance log 116 in block 802, the performance manager 114 may select a next highest priority host 110 for performance testing. After selecting a different host 110 for performance testing, availability of the different host 110 is checked in block 804-806. The selection process may continue until the performance manager 114 identifies a host 110 having computing assets available for use in performance testing.

Figure 9:
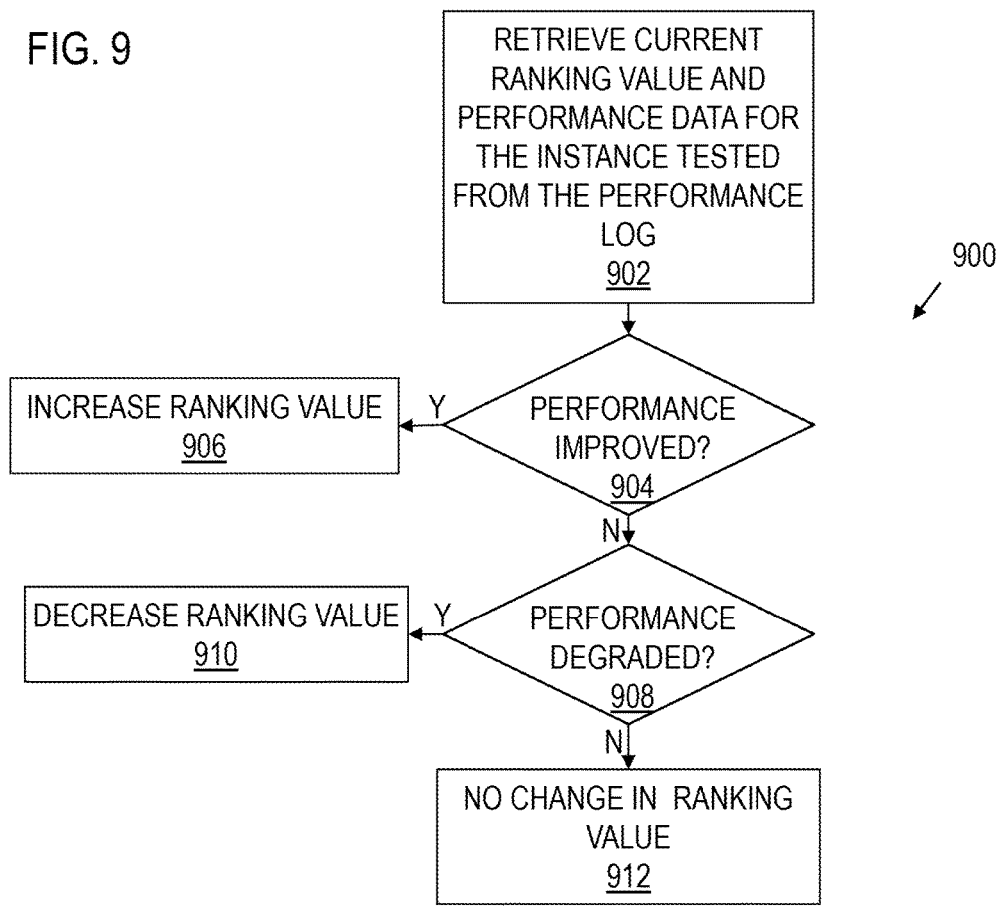
FIG. 9 shows a flow diagram for a method for updating the performance ranking of a host device in accordance with various examples.

FIG. 9 shows a flow diagram for a method 900 for updating a performance ranking of a host 110 in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 900 may be provided by instructions executed by a computer of the system 102. Operations of the method 900 may be performed as part of the operation of block 710 of method 700 shown in FIG. 7.

In block 902, the performance manager 114 retrieves, from the host performance log 116, performance data for the test host 110 (i.e., a host 110 currently being tested). The performance data may include results of a previous executed performance test. The performance manager 114 also retrieves, from the host performance log 116, the current ranking of the tested host 110.

In blocks 904 and 908, the performance manager 114 compares the performance data retrieved from the host performance log 116 to the test results produced by the instance 112 (e.g., the result produced by the performance test execution of block 708). If the test results indicate that the performance of the host 110 has improved relative to the results provided as part of the performance data retrieved from the host performance log 116, then in block 906, the performance manager 114 increases the ranking value associated with the tested host 110. For example, if the test results indicate that processor performance is 1% higher than that recorded in the performance data retrieved from the host performance log 116, then, all other test results being equal to those recorded in the performance data retrieved from the host performance log 116, the performance manager 114 may increment the ranking value associated with the tested host.

If, in block 908, the performance manager 114 determines that the test results indicate that the performance of the host 110 has degraded relative to the results provided as part of the performance data retrieved from the host performance log 116, then in block 910, the performance manager 114 decreases the ranking value associated with the tested host 110. For example, if the test results indicate that processor performance is 1% lower than that recorded in the performance data retrieved from the host performance log 116, then, all other test results being equal to those recorded in the performance data retrieved from the host performance log 116, the performance manager 114 may decrement the ranking value associated with the tested host.

If the performance manager 114 finds, in block 904 and 908, that the performance of the tested host 110 has not changed, then, in block 912, the performance manager 912 maintains the current ranking value for the tested host 110.

Figure 10:
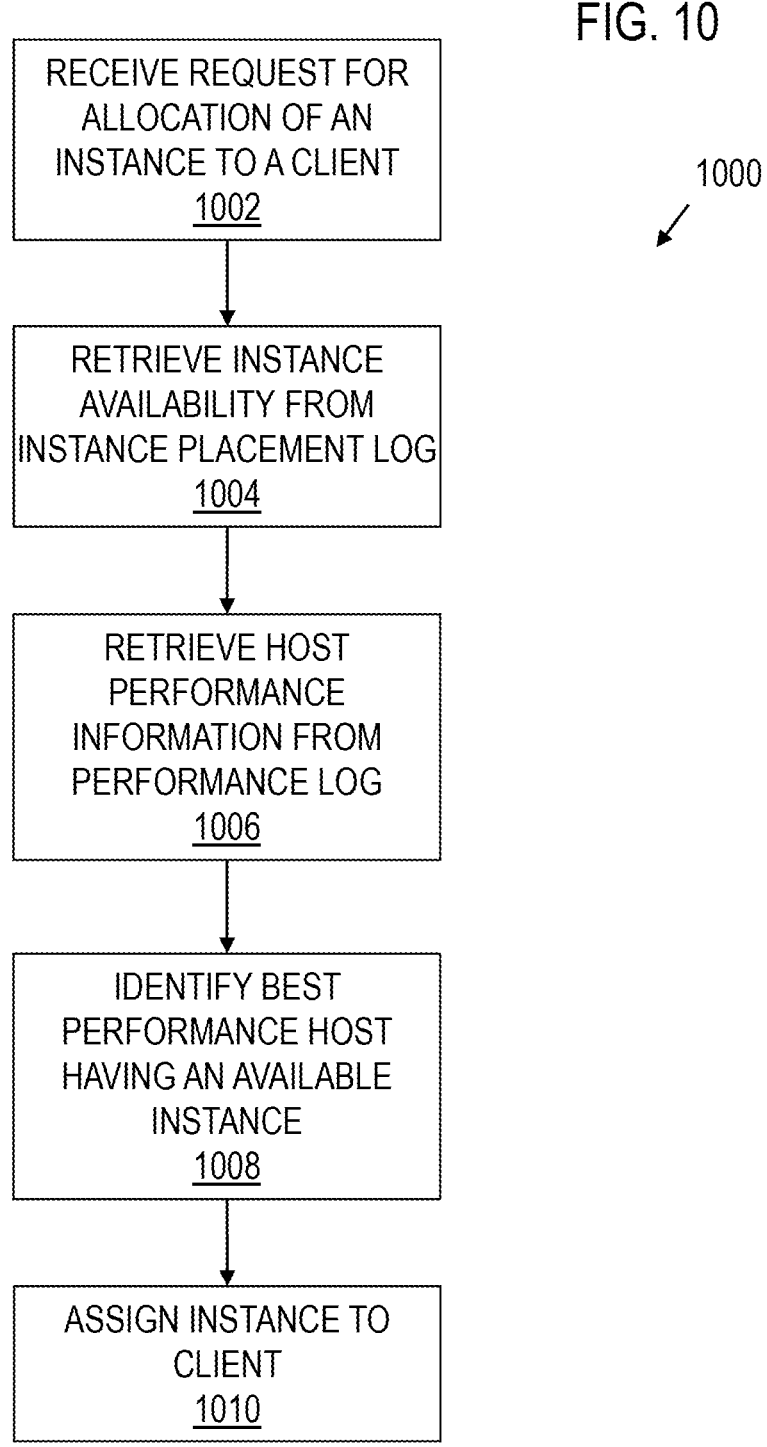
FIG. 10 shows a flow diagram for a method for selecting a resource instance to be assigned to a client in accordance with various examples.

FIG. 10 shows a flow diagram for a method 1000 for selecting a resource instance to be assigned to a client in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 1000 may be provided by instructions executed by a computer of the system 102.

In block 1002, the placement manager 120 receives a request for allocation of a resource instance 112 to a client. For example, the client 126 may request allocation of a resource instance 112 for use in executing an application of the client 126, such as a web server. The client 126 may transmit the request to the placement manager 120 via the internet 124 and the interface manager 122. The request may identify a specific type of resource instance to be allocated. For example, one type of resource instance 112 may include a given number of processors, a given amount of memory, etc., while another type of resource instance 112 may include a different number of processor, a different amount of memory, etc.

In block 1004, the placement manager 120 accesses the instance placement log 118 and retrieves instance availability data. The instance availability data identifies hosts 110 having computing assets, and corresponding resource instances 112, available for allocation. The instance availability data may identify only hosts 110 having available resource instances 112 of the type requested by the client.

In block 1006, the placement manager 120 retrieves host performance information from the host performance log 116. The host performance information includes the ranking values associated with each of the hosts 110 identified as including a resource instance 112 available for allocation. The host performance information may also include, for each host 110, a loading value that specifies how highly loaded the host 110 was when last performance tested.

In block 1008, the placement manager 120 evaluates the host performance information to identify which of the hosts 110 that has an instance 112 available for allocation offers the best performance, and selects a host 110 from which to allocation a resource instance 112 to the client. Further details regarding selection of a host 110 based on host performance are provided in FIG. 11 and associated text.

In block 1010, the placement manager 120 assigns a resource instance 112 from the selected host 110 to the client. The placement manager 120 may also update the instance placement log 118 to indicate that the assigned instance is no longer available for allocation to another client, or for use in performance testing.

Figure 11:
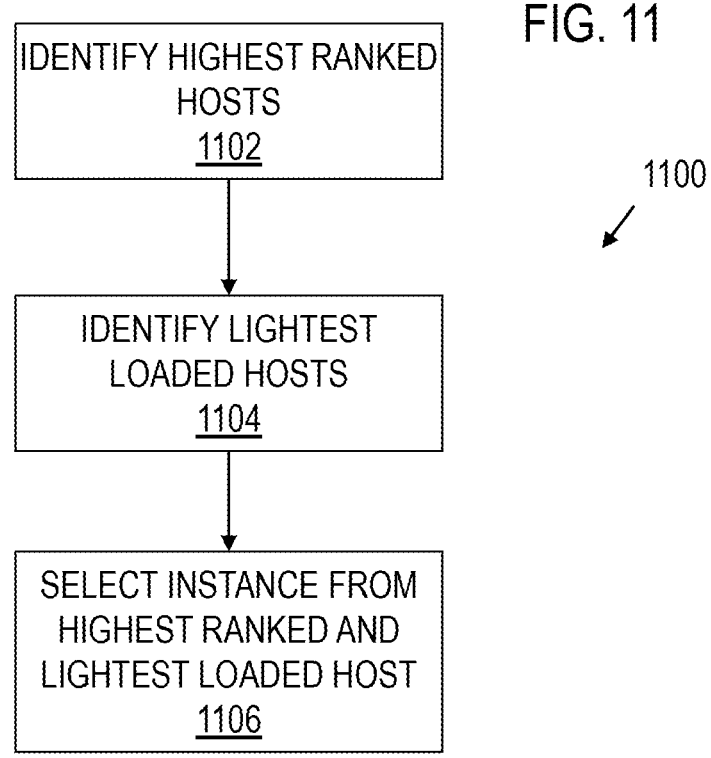
FIG. 11 shows a flow diagram for a method for applying host ranking in selection of a resource instance to be assigned to a client in accordance with various examples.

FIG. 11 shows a flow diagram for a method 1100 for applying host ranking in selection of a resource instance 112 to be assigned to a client in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 1100 may be provided by instructions executed by a computer of the system 102. Operations of the method 1100 may be performed as part of the operation of block 1010 of method 1000 shown in FIG. 10.

In block 1102, the placement manager evaluates the host performance information to identify which of the hosts 110 is highest ranked, wherein a higher ranking value corresponds to higher measured performance.

The placement manager 120 may also consider the loading of the hosts 110 in selecting a host 110 from which to allocate a resource instance. The placement manager 120 may prefer to allocate resource instances from more lightly loaded hosts 110. Consequently, if two hosts 110 have an equal ranking value, then the placement manager 120 may choose to allocate an instance from the more lightly loaded of the two hosts 110. In block 1104, the placement manager 1104 analyzes the loading values received with the host performance information to identify the most lightly loaded of the highest ranked hosts 110.

In block 1106, the placement manager 120 selects a resource instance 112 from one of the most highly ranked and most lightly loaded of the hosts 110 to allocate to the client.

Figure 12:
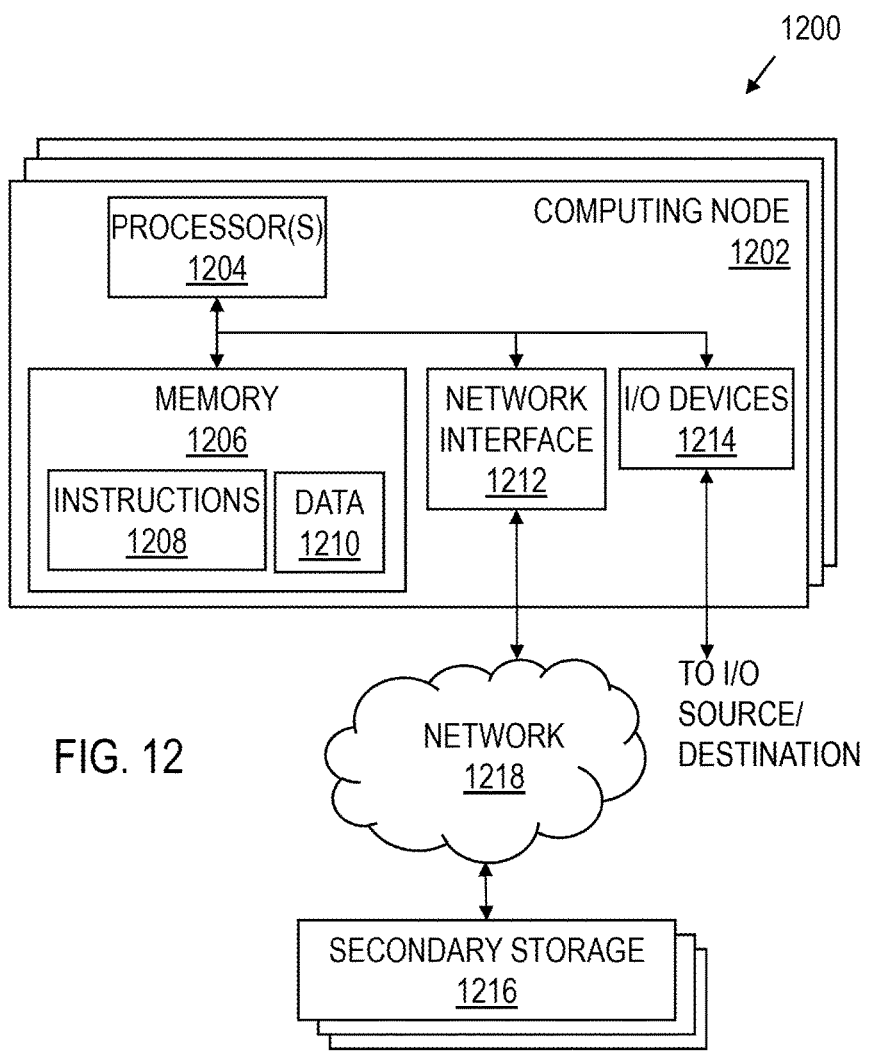
FIG. 12 shows a schematic diagram for a computing system suitable for implementation of continuous host performance testing in accordance with various examples.

FIG. 12 shows a schematic diagram for a computing system suitable for implementation of the system 102 in accordance with various examples. The computing system 1200 includes one or more computing nodes 1202 and secondary storage 1216 that are communicatively coupled via a network 1218. One or more of the computing nodes 1202 and associated secondary storage 1216 may be applied to provide the functionality of the system 102 including the hosts 110, the resource instances 112, the performance manager 114, the placement manager 112, the host performance log 116, and the instance placement log 118, and other components of the system 102.

Each computing node 1202 includes one or more processors 1204 coupled to memory 1206, network interface 1212, and I/O devices 1214. In some embodiments of the system 100, a computing node 1202 may implement the functionality of more than one component of the system 100. In various embodiments, a computing node 1202 may be a uniprocessor system including one processor 1204, or a multiprocessor system including several processors 1204 (e.g., two, four, eight, or another suitable number), Processors 1204 may be any suitable processor capable of executing instructions. For example, in various embodiments, processors 1204 may be general-purpose or embedded microprocessors implementing any of a variety of instruction set architectures (ISAs), such as the x86, PowerPC, SPARC, or MIPS ISAs, or any other suitable ISA. In multiprocessor systems, each of processors 1204 may commonly, but not necessarily, implement the same ISA. Similarly, in a distributed computing system such as one that collectively implements the system 102, each of the computing nodes 1202 may implement the same ISA, or individual computing nodes and/or replica groups of nodes may implement different ISAs.

The memory 1206 may include a non-transitory, computer-readable storage medium configured to store program instructions 1208 and/or data 1210 accessible by processor(s) 1204. The system memory 1206 may be implemented using any suitable memory technology, such as static random access memory (SRAM), synchronous dynamic RAM (SDRAM), nonvolatile/Flash-type memory, or any other type of memory. Program instructions 1208 and data 1210 implementing the functionality disclosed herein are stored within system memory 1206. For example, instructions 1208 may include instructions that when executed by processor(s) 1204 implement the resource manager 116, the resource management database 122, the instances 112, and other systems and components disclosed herein.

Secondary storage 1216 may include volatile or non-volatile storage and storage devices for storing information such as program instructions and/or data as described herein for implementing the system 102. The secondary storage 1216 may include various types of computer-readable media accessible by the computing nodes 1202 via the network 1218. A computer-readable medium may include storage media or memory media such as semiconductor storage, magnetic or optical media, e.g., disk or CD/DVD-ROM, or other storage technologies. Program instructions and data stored on the secondary storage 1216 may be transmitted to a computing node 1202 for execution by a processor 1204 by transmission media or signals via the network 1218, which may be a wired or wireless network or a combination thereof.

The network interface 1212 may be configured to allow data to be exchanged between computing nodes 1202 and/or other devices coupled to the network 1218 (such as other computer systems, communication devices, input/output devices, or external storage devices). The network interface 1212 may support communication via wired or wireless data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1214 may include one or more display terminals, keyboards, keypads, touchpads, scanning devices, voice or optical recognition devices, or any other devices suitable for entering or retrieving data by one or more computing nodes 1202. Multiple input/output devices 1214 may be present in a computing node 1202 or may be distributed on various computing nodes 1202 of the system 1200. In some embodiments, similar input/output devices may be separate from computing node 1202 and may interact with one or more computing nodes 1202 of the system 102 through a wired or wireless connection, such as over network interface 1212.

Those skilled in the art will appreciate that computing system 1200 is merely illustrative and is not intended to limit the scope of embodiments. In particular, the computing system 1200 may include any combination of hardware or software that can perform the functions disclosed herein, including computers, network devices, internet appliances, PDAs, wireless phones, pagers, etc. Computing node 1202 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

Certain terms are used throughout the foregoing description and the following claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be based on Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:

a plurality of computing devices, each of the computing devices configurable to host a plurality of resource instances of a provider network;

a first computing node configured to implement a performance manager that monitors the performance of the computing devices, the performance manager configured to:

for each one of the computing devices:

access a placement database to identify computing assets of the one of the computing devices that are not assigned to a client for performance testing, wherein the computing assets comprise computer hardware dedicated to the given one of the resource instances;

reserve the computing assets for use in performance testing the one of the computing device;

download performance test program instructions to the computing assets for execution;

execute the performance test instructions using the available computing assets to performance test the one of the computing devices;

update a ranking value that establishes precedence for allocation of the resource instances of the one of the computing devices to a client; and release the computing assets for allocation to a client after execution of the downloaded performance test instructions; and a second computing node configured to implement a placement manager that assigns resource instances for use by clients, the placement manager configured to:

update the placement database to identify which computing assets of the one of the computing devices are assigned to a client;

identify a given one of the computing devices having a highest ranking value; and assign a resource instance for use by a given client from the given one of the computing devices.

2. The system of claim 1, wherein the performance manager is configured to:

decrease the ranking value assigned to the one of the computing devices based on results of the performance test indicating that performance of the one of the computing devices has decreased; and increase the ranking value assigned to the one of the computing devices based on results of the performance test indicating that performance of the one of the computing devices has increased.

3. The system of claim 1, wherein the performance manager is configured to:

determine a measure of loading of the one of the computing devices caused by a client application executed by a resource instance of the one of the computing devices at a time the performance test is performed;

record the measure of loading in association with the ranking value; and wherein the placement manager is configured to select the resource instance to assign for use by the given client based on the measure of loading.

4. A system, comprising:

a plurality of computing devices, each of the computing devices configurable to host a plurality of resource instances of a provider network;

a first computing node configured to execute a performance manager that monitors the performance of the computing devices, the performance manager configured to:

for each one of the computing devices:

access a placement database to identify available hardware computing assets of the one of the computing devices that are not assigned to a client, and reserve the hardware computing assets for use in performance testing the one of the computing devices;

download performance test program instructions to the hardware computing assets for execution;

execute the performance test instructions using the available computing assets to measure performance of the one of the computing devices;

update, based on measured performance of the one of the computing devices, a ranking value that establishes precedence for allocation of the resource instances of the one of the computing devices to a client; and release the hardware computing assets for allocation to a client after execution of the downloaded performance test instructions; and a second computing node configured to execute a placement manager that assigns resource instances for use by clients, the placement manager configured to:

update the placement database to identify which computing assets of the one of the computing devices are assigned to a client; and select and assign a resource instance for use by a given client based on the ranking values associated with the computing devices.

5. The system of claim 4, wherein the performance manager is configured to:

measure time since performance of each of the computing devices was last measured;

set priorities for performance testing the computing devices in accordance with the time since performance of each of the computing devices was last measured; and performance test the computing devices in an order according the priorities.

6. The system of claim 4, wherein the performance manager is configured to:

determine a measure of loading of the one of the computing devices at a time the performance is measured;

record the measure of loading in association with the ranking value.

7. The system of claim 6, wherein the placement manager is configured to select the resource instance to assign for use by the given client based on the measure of loading, wherein given a same ranking value a lower measure of loading is preferred over a higher measure of loading.

8. The system of claim 4, wherein the performance manager is configured to:

decrease the ranking value assigned to the one of the computing devices based on results of the performance test indicating that performance of the one of the computing devices has decreased relative to results of a previous performance test.

9. The system of claim 4, wherein the performance manager is configured to:

increase the ranking value assigned to the one of the computing devices based on results of the performance test indicating that performance of the one of the computing devices has increased relative to results of a previous performance test.

10. The system of claim 4, wherein the performance manager is configured to:
- select computing assets of the one of the computing devices associated with a resource instance of the one of the computing devices;
- execute performance tests, using the computing assets, that test processor performance, memory performance, secondary storage performance, and network performance of the computing assets.

11. The system of claim 4, wherein the performance manager is configured to maintain, for each one of the computing devices, a performance history for each set of computing assets that is used to execute performance tests that measure performance of the one of the computing devices.

12. The system of claim 4, wherein the placement manager is configured to:
- for each one of the computing devices:
  - initialize the ranking value to a maximum predetermined value; and
  - reduce the ranking value based on measured performance after the one of the computing devices is available for use by a client.

13. A method, comprising:
- configuring each of a plurality of computing devices to implement a plurality of resource instances of a provider network;
- for each of the computing devices:
  - accessing a placement database to identify available hardware computing assets of the computing device that are not allocated to a client;
  - reserving the hardware computing assets for use in performance testing the computing device;
  - downloading performance test program instructions to the reserved hardware computing assets for execution;
  - executing performance tests using the available computing assets to measure performance of the computing device by executing the downloaded performance test program instructions;
  - after measuring performance, releasing the computing assets for allocation to a client; and
  - revising, based on measured performance, a ranking value associated with the computing device, wherein the ranking value establishes precedence for allocation of the resource instances of the computing device to a client;
- selecting a resource instance to assign to a given client based on the ranking values;
- assigning the resource instance to the given client; and
- updating the placement database to identify which computing assets are assigned to a client.

14. The method of claim 13, further comprising:
- measuring time since performance of each of the computing devices was last measured;
- setting priorities for performance testing the computing devices in accordance with the time since performance of each of the computing devices was last measured; and
- performance testing the computing devices in an order according the priorities.

15. The method of claim 13, further comprising:
- determining a measure of loading of each of the computing devices caused by a client application executed by a resource instance at a time the performance is measured;
- recording the measure of loading in association with the ranking value.

16. The method of claim 15, further comprising selecting the resource instance to assign for use by the given client based on the measure of loading, wherein, given a same ranking, value lower measures of loading are preferred over high measures of loading.

17. The method of claim 13, further comprising:
- decreasing the ranking value assigned to one of the computing devices based on results of the performance test indicating that performance of the one of the computing devices has decreased relative to results of a previous performance test; and
- increasing the ranking value assigned to the one of the computing devices based on results of the performance test indicating that performance of the one of the computing devices has increased relative to results of a previous performance test.

18. The method of claim 13, further comprising:
- selecting computing assets of the one of the computing devices associated with a resource instance of the one of the computing devices;
- executing performance tests using the computing assets that test processor performance, memory performance, secondary storage performance, and network performance of the resource instance.

19. The method of claim 13, further comprising maintaining, for each one of the computing devices, a performance history for each set of computing assets that is used to execute performance tests that measure performance of the one of the computing devices.

20. The method of claim 13, further comprising:
- for each one of the computing devices:
  - initializing the ranking value to a maximum predetermined value; and
  - reducing the ranking value based on measured performance after the one of the computing devices is available for use by a client.

* * * * *